Dec. 29, 1936.  H. A. FREEMAN  2,066,265
METHOD OF CURING TIRES
Filed Nov. 25, 1933
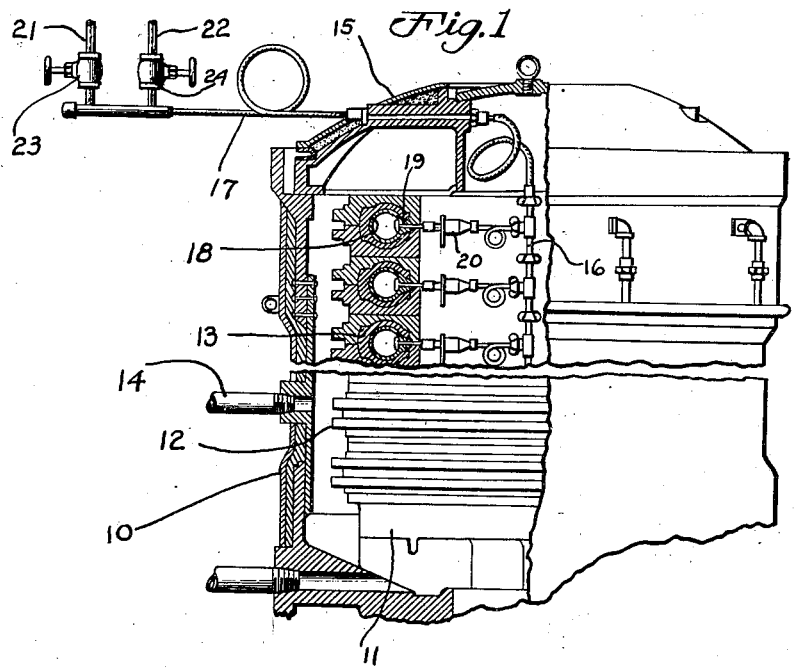
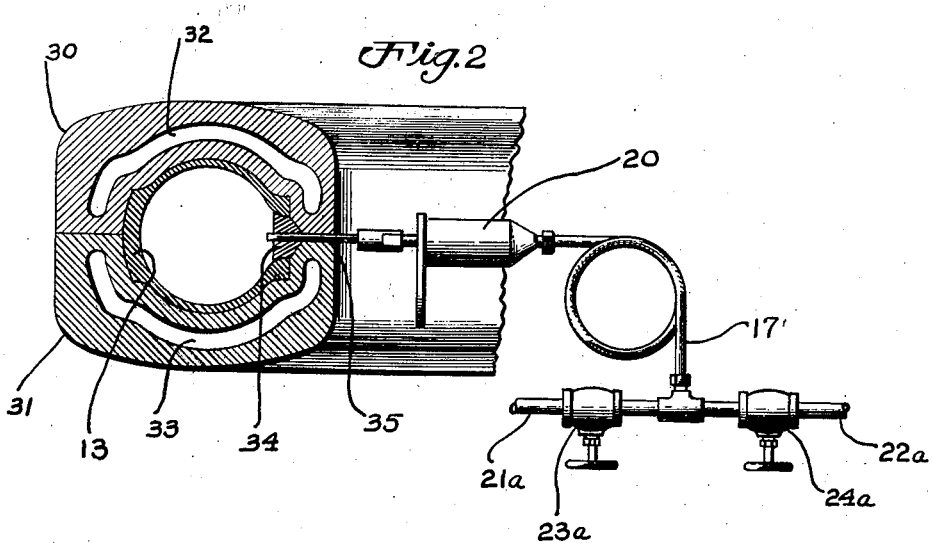
Inventor
Harold A. Freeman
By
Attorney Patented Dec. 29, 1936

2,066,265

UNITED STATES PATENT OFFICE 2,066,265

METHOD OF CURING TIRES

Harold A. Freeman, Akron, Ohio, assignor to Wingfoot Corporation, Wilmington, Del., a corporation of Delaware Application November 25, 1933, Serial No. 699,692

7 Claims. (Cl. 18—53)

This invention relates to the art of manufacturing pneumatic tires and other articles made wholly or partly of rubber, and it refers more particularly to improvements in curing pneumatic tires and other similarly expansible and inflatable articles.

In their manufacture, pneumatic tires are built up of a number of plies of rubberized cord fabric, beads, breaker strips, and the like, and the tread and sidewall portions are covered with rubber of suitable composition. The whole is then vulcanized whereby to give the final size, shape and wearing properties. Vulcanization has been effected ordinarily by confining the tires within molds and subjecting them to heat and pressure for a predetermined time period, the heat usually being applied externally to the mold and the pressure being applied internally to the tire. One type of conventional apparatus known as a pot heater for curing tires in accordance with the prior art is disclosed in the Kilborn and Shively Patent No. 1,477,879, issued December 18, 1923. Another type of apparatus with which this invention may be used is the individual vulcanizer, which is well-known to those skilled in the art.

In applying pressure to the insides of tires during cure, various pressure fluids have been used heretofore. The most common practice has been to dispose within the tire an inflatable former known as an airbag, which is inflated by compressed air whereby to be expanded and thus to press the sidewalls, beads, and tread portions of the tire outwardly and uniformly into contact with the walls of the confining mold. In some instances, similar inflatable formers have been used but instead of compressed air, either hot water or a gas such as carbon dioxide has been employed as the inflating medium. In another type of cure the inflatable former has been dispensed with and compressed air alone has been caused to act directly upon the interior surfaces of the tire to effect expansion of the same against the surfaces of the mold cavities. In either case there have been involved certain difficulties which the present invention completely overcomes.

One of the objections to the prior art vulcanizing operatons lies in the fact that considerable time is required to complete the cure, but further than this in the case of cure on air, difficulties have been encountered in that the heat must travel entirely through the tire from the outside to the inside in order properly to cure the carcass. Because of such arrangement, there is likelihood of overheating and consequently over-curing the outer portions of the rubber, and in order to reduce to a minimum such likelihoods, it has been necessary in compounding the rubber to employ chemicals which would accelerate the vulcanization. Due to the progress which has been made in those directions, excellent tires have been produced by the prior art methods, but the curing operations have been costly because of the labor involved and because of the relatively long time necessary to complete the cure.

The present invention overcomes the objectionable features of the prior art and provides an improved method for vulcanizing tires and similar articles in much less time than has heretofore been required, and yet giving cure uniformity in the quality of the product.

More specifically, the invention greatly reduces the time required for the curing operation by supplying heat both from within and from without the tire. The object of this is to commence the curing of the carcass at approximately the same time as the tread cure is started. But then, after a predetermined time this inside heat is discontinued so as to avoid overcuring of the carcass. The initial inside heating is accomplished by admitting steam, either to the inside of the airbag or directly to the inside of the tire if an airbag is not employed, and then at a given time in the curing cycle, to admit compressed air to take the place of the steam, thus cutting off excessive inside cure while maintaining the inside pressure.

The foregoing and other objects, features, and advantages of the invention will readily appear from the following description when read in conjunction with the accompanying drawing wherein, by way of illustration, there are shown two forms of apparatus with which the invention may be practiced. In the drawing, Fig. 1 is a view, partly in section and partly in elevation, showing the use of the novel method in curing pneumatic tires in a pot heater.

Fig. 2 is a sectional view showing the application of the new method to an individual tire mold.

In practicing the invention, the tire or other article to be vulcanized is placed within a suitable confining mold either with or without an airbag, as may be preferred, and therein the tire is expanded by steam, the mold being at the same time externally heated. Thus the vulcanizing action is caused to proceed outwardly from the inside of the tire as well as inwardly from the outside of the tire. The steam used within the tire must be of sufficient pressure to expand the carcass properly and to cause the rubber to flow into the cavities which form the non-skid tread design, but steam at that pressure is of too high a temperature to be maintained during the entire cure without injuring the tire carcass. It is necessary, therefore, to check the internal temperature without decreasing the pressure and therein lies the principal novelty of the invention. This is accomplished by replacing the steam by another pressure medium of lower temperature, compressed air having been found to give excellent results though other media may be used with equal advantage. Thus after the vulcanizing action has proceeded for a certain length of time (one to thirty or more minutes, dependent upon the size of the tire) the steam supplied to the inside of the tire is shut off and air at the same or higher pressure is "turned on" to fill the tire and to maintain the pressure therein while the external heating continues. After a further lapse of time sufficient to complete the cure, the heat may be cut off, the pressure released, and the mold opened to permit removal of the finished tire.

While the novel method may be employed in the production of other articles, it is particularly adapted for the original manufacture of pneumatic tires, and in such manufacture conventional or standard equipment may be used with only minor changes or additions in the connections of the pressure fluids. By way of illustration reference may be had to Fig. 1 of the accompanying drawing wherein the invention is shown as being practiced with a plurality of molds in a pot heater. Such a pot heater is designated generally by the reference character 10 and, as well known to those skilled in the art, comprises a vertically disposed substantially cylindrical vessel having in its closed lower end a hydraulic ram 11 upon which are stacked a plurality of annular sectional molds 12, each mold being provided with suitable cavities for confining the tires 13 to be vulcanized by the application of heat and pressure. The heating is effected by the circulation of steam or other suitable heating medium through the interior of the heater and around the mold sections 12, such heating medium being introduced as at 14 through a suitable pipe leading from any appropriate source of supply. The upper end of the pot heater is closed by a removable cover 15 which, when locked in place, serves as an abutment against which the ram 11 maintains the molds in stacked relation and each tightly closed.

During the vulcanizing operation the tire casings 13 are tightly pressed against the cavity walls of their respective molds by being inflated with a pressure fluid supplied from a sectional manifold 16, which in turn is connected to a suitable source of supply by means of a flexible hose 17 or the like. According to the present invention two inflating media are used successively, the first being steam and the second being compressed air. These inflating media may be introduced directly to the interior of the tires or, as shown in Fig. 1, they may be introduced into an inflatable former or curing bag 18 which is initially placed within each tire. Each curing bag is provided with one or more tubular stems 19 extending through the inner peripheral wall of the confining mold 12 and connected to the manifold 16 by means of a readily detachable coupling unit 20 of any ordinary or preferred type. One preferred form of such coupling unit is disclosed in the application of Clyde E. Stebbins, Ser. No. 645,023, filed November 30, 1932. The flexible hose or conduit 17 is suitably connected to a steam supply pipe 21 and to an air supply pipe 22, said pipes being respectively provided with control valves 23 and 24, whereby fluid may be selectively supplied from either of the said pipes.

In practicing the invention there are certain factors which may be varied to meet the requirements and limitations of plant installations and in this respect reference is made particularly to the curing temperatures, pressures and time periods. It has been found that excellent results may be obtained by having the steam with the heater 10 at a temperature of approximately 290° F. while the steam supplied through the pipe 21 to the interiors of the curing bags 18 will be at a temperature of approximately 372° F. (160 pounds of pressure). Preferably after the pot heater has been closed the valve 23 will be opened to supply steam to the curing bags 18 for a short time prior to the supply of steam to the heater through the pipe 14. By way of illustration it may be said that this time period can be approximately ten minutes and its object is to facilitate the building up of pressure and temperature within the tire and compensating for condensation before the outside cure commences. Thereafter the steam supply through the pipe 14 and within the heater 10 may be constantly maintained for approximately 45 minutes, after which such steam supply is cut off preparatory to opening of the heater. In the meantime, however, the valve 23 will have been closed and the valve 24 opened, whereby to discontinue the supply of steam to the interior of the tires and in place thereof to supply compressed air at a pressure of approximately 200 pounds per square inch, and such air pressure will be maintained during the balance of the time of external heating. For certain sizes of tires the total steaming time within the curing bags is 22 minutes, whereas for other sizes of tires this time may be shorter or longer. It is to be noted that the admission of compressed air to the curing bags which are already filled with steam can be very easily accomplished by reason of the fact that the steam immediately condenses and thereafter the internal heating of the tire is checked. After sufficient time has elapsed to complete the cure of the tires in all their parts, the steam supply in the pipe 14 and the air supply in the manifold 16 are discontinued and the molds sprayed in the usual way with cooling water for several minutes, after which the cover 15 may be removed and the molds taken out of the heater and opened to give access to the finished tires.

Experience has shown that tires may be vulcanized by this new method in much less time than has heretofore been required by the usual cure with air in airbag and for this reason the tire manufacturers' equipment costs are very substantially reduced. Furthermore, the method is desirable because it makes possible a unit time of curing for tires of different sizes and such unit time greatly facilitates the carrying out of production schedules.

As previously stated the use of the novel method is not limited to pot heaters but the invention may in fact be practiced also with individual tire molds such as are sometimes referred to as watch case heaters. Such a mold is shown diagrammatically in Fig. 2 and comprises a pair of opposed mold sections 30 and 31 which define between them a cavity for confining the tire 13. The mold sections 30 and 31 may be hingedly or otherwise assembled and supported in a unitary machine and the mold sections are characterized by annular chambers or jackets 32 and 33 which surround the tire-confining cavity and are connected with a suitable source of steam supply whereby the molds are heated. As in the first described embodiment illustrated in Fig. 1, the tires 13 may be expanded in the molds through the medium of a curing bag or by direct application of the pressure fluid without a curing bag. The latter form is illustrated in Fig. 2 wherein the bead portions of the tire are held against the bead seats of the mold sections by an annular clamping and sealing ring 34 of any preferred type, such sealing ring carrying a tubular inflation stem 35 which extends through an inner peripheral wall of the assembled mold and is connected by a coupling 20 to a pressure supply hose or pipe 17. The hose or pipe 17 is in turn connected to a steam supply pipe 21A and to an air supply pipe 22A and the supply of pressure from said pipes being respectively controlled by valves 23A and 24A. With this type of apparatus the steps in the method are substantially the same as those already described and, therefore, they need not be repeated.

While the invention has been described in connection with the curing of tires, it is to be understood that the novel method may also be employed in curing other inflatable articles such as inner tubes and airbags and the like.

From the foregoing it will be evident that a novel method has been provided for vulcanizing pneumatic tires and similar articles, the method being advantageous in that it materially reduces tire-manufacturing costs without sacrificing quality of product. The invention is of course susceptible of numerous modifications in the details of the method steps and the right is herein reserved to make such changes as fall within the scope of the appended claims without departing from the spirit of the invention.

Having thus described my invention, what is claimed is:

1. In the art of manufacturing inflatable articles, the curing method which comprises subjecting all parts of the articles to uniform pressure while heating both internally and externally for a predetermined time period, and then substantially discontinuing the supply of internal heat without relieving the pressure while continuing the external heat for a longer time period.

2. In the art of manufacturing pneumatic tires, the curing method which comprises subjecting all parts of the tire to vulcanizing heat and pressure for a relatively short predetermined time period, and then increasing the pressure and decreasing the internal temperature a substantial amount below ordinary vulcanizing temperature and thus continuing the cure for a longer time period.

3. In the art of manufacturing pneumatic tires, the curing method which comprises subjecting all parts of the tire to substantially uniform pressure while heating both internally and externally for a predetermined time period, and then substantially reducing the internal heat to less than vulcanizing temperature and increasing the pressure while continuing the external heat for a longer time period.

4. In the method of curing a pneumatic tire, the steps which comprise confining the tire within a heated mold, and expanding the tire within the mold successively with steam and with compressed air of temperature less than that required for vulcanization.

5. In the method of curing a pneumatic tire, the steps which comprise confining the tire within a mold, heating the mold, and expanding the tire within the mold with steam for a relatively short period and then with relatively cool compressed air for a longer period.

6. The method of curing a pneumatic tire which comprises confining the tire within a mold, expanding the tire within the mold with high pressure steam, whereby to apply vulcanizing heat and pressure, additionally heating the exterior of the mold, and replacing the steam in the tire with a non-heating pressure fluid whereby to cut off the internal heating as the external heating continues.

7. In the art of manufacturing inflatable articles, the curing method which comprises subjecting the articles to pressure while heating both internally and externally for a predetermined time period, and then discontinuing the internal heat while continuing the pressure and external heat for a longer time period.

HAROLD A. FREEMAN.